(12) United States Patent
Chen et al.

(10) Patent No.: US 12,682,516 B2
(45) Date of Patent: Jul. 14, 2026

(54) TEXTURE COMPRESSION METHOD

(71) Applicant: Beken Corporation, Shanghai (CN)

(72) Inventors: Lulai Chen, Shanghai (CN); Siwei Ye, Shanghai (CN); Weifeng Wang, Shanghai (CN)

(73) Assignee: Beken Corporation, Shanghai (CN)

( * ) Notice: Subject to any disclaimer, the term of this patent is extended or adjusted under 35 U.S.C. 154(b) by 157 days.

(21) Appl. No.: 18/663,816

(22) Filed: May 14, 2024

(65) Prior Publication Data

US 2025/0336106 A1    Oct. 30, 2025

(30) Foreign Application Priority Data

Apr. 28, 2024    (CN) .......................... 202410526066.8

(51) Int. Cl.
| | |
|---|---|
| *G06T 9/00* | (2006.01) |
| *G06T 7/90* | (2017.01) |
| *G06T 11/10* | (2026.01) |
| *G06V 10/56* | (2022.01) |
| *G06V 10/762* | (2022.01) |

(52) U.S. Cl.
CPC ................ *G06T 11/10* (2026.01); *G06T 7/90* (2017.01); *G06V 10/56* (2022.01); *G06V 10/762* (2022.01); *G06T 2207/10024* (2013.01)

(58) Field of Classification Search
CPC .................... G06T 11/001; G06T 2207/10024
USPC .......................................................... 345/589
See application file for complete search history.

(56) References Cited

U.S. PATENT DOCUMENTS

| | | | |
|---|---|---|---|
| 10,091,512 B2 * | 10/2018 | Xu ......................... | H04N 19/44 |
| 2003/0103669 A1 * | 6/2003 | Bucher ................... | H04N 1/644 |
| | | | 382/162 |
| 2023/0343017 A1 * | 10/2023 | Yang ........................ | G06T 7/11 |

\* cited by examiner

*Primary Examiner* — Samantha (Yuehan) Wang
(74) *Attorney, Agent, or Firm* — Schwegman Lundberg & Woessner, P.A.

(57) ABSTRACT

The present disclosure provides a system and method for effectively compressing an image with low bandwidth and memory requirements while retaining a high quality. The method includes obtaining a block of an image including a plurality of pixels, obtaining a preliminary color map, iteratively updating the preliminary color map to generate an updated color map, generating indexes for the plurality of pixels, wherein each of the plurality of pixels has an index pointing to a color in the updated color map, determining an average color corresponding to colors with same indexes, replacing the color in the updated color map by the average color to generate an averaged color map, and storing the averaged color map and the indexes of the plurality of pixels as a representation of the block of the image.

18 Claims, 17 Drawing Sheets

302

| | | | |
|---|---|---|---|
| R20 G115 B200 | R30 G135 B200 | R35 G135 B205 | R35 G135 B205 |
| R30 G135 B200 | R35 G135 B205 | R45 G175 B125 | R45 G175 B125 |
| R35 G175 B125 | R45 G175 B125 | R45 G175 B195 | R45 G175 B195 |
| R35 G185 B125 | R135 G185 B125 | R225 G50 B110 | R235 G50 B105 |

| 0 |
|---|
| 0 |
| 0 |
| 0 |

| 768 | 768 | 768 | 768 |
|-----|-----|-----|-----|
| 768 | 768 | 768 | 768 |
| 768 | 768 | 768 | 768 |
| 768 | 768 | 768 | 768 |

| | | | |
|---|---|---|---|
| R135 G185 B125 | R20 G115 B200 | 0 | 0 |

| | | | |
|---|---|---|---|
| 260(k=1) | 230(k=1) | 230(k=1) | 170(k=1) |
| 155(k=1) | 230(k=1) | 100(k=1) | 170(k=1) |
| 110(k=1) | 100(k=1) | 170(k=1) | 170(k=1) |
| 100(k=1) | 0(k=1) | 240(k=1) | 255(k=1) |

| R135 G185 B125 | R20 G115 B200 | R235 G50 B105 | 0 |

710

704

702

| 0(k=2) | 30(k=2) | 40(k=2) | 90(k=2) |
| 30(k=2) | 40(k=2) | 100(k=1) | 90(k=2) |
| 110(k=1) | 100(k=1) | 90(k=2) | 90(k=2) |
| 100(k=1) | 0(k=1) | 240(k=1) | 255(k=1) |

706

Figures 8A, 8B:
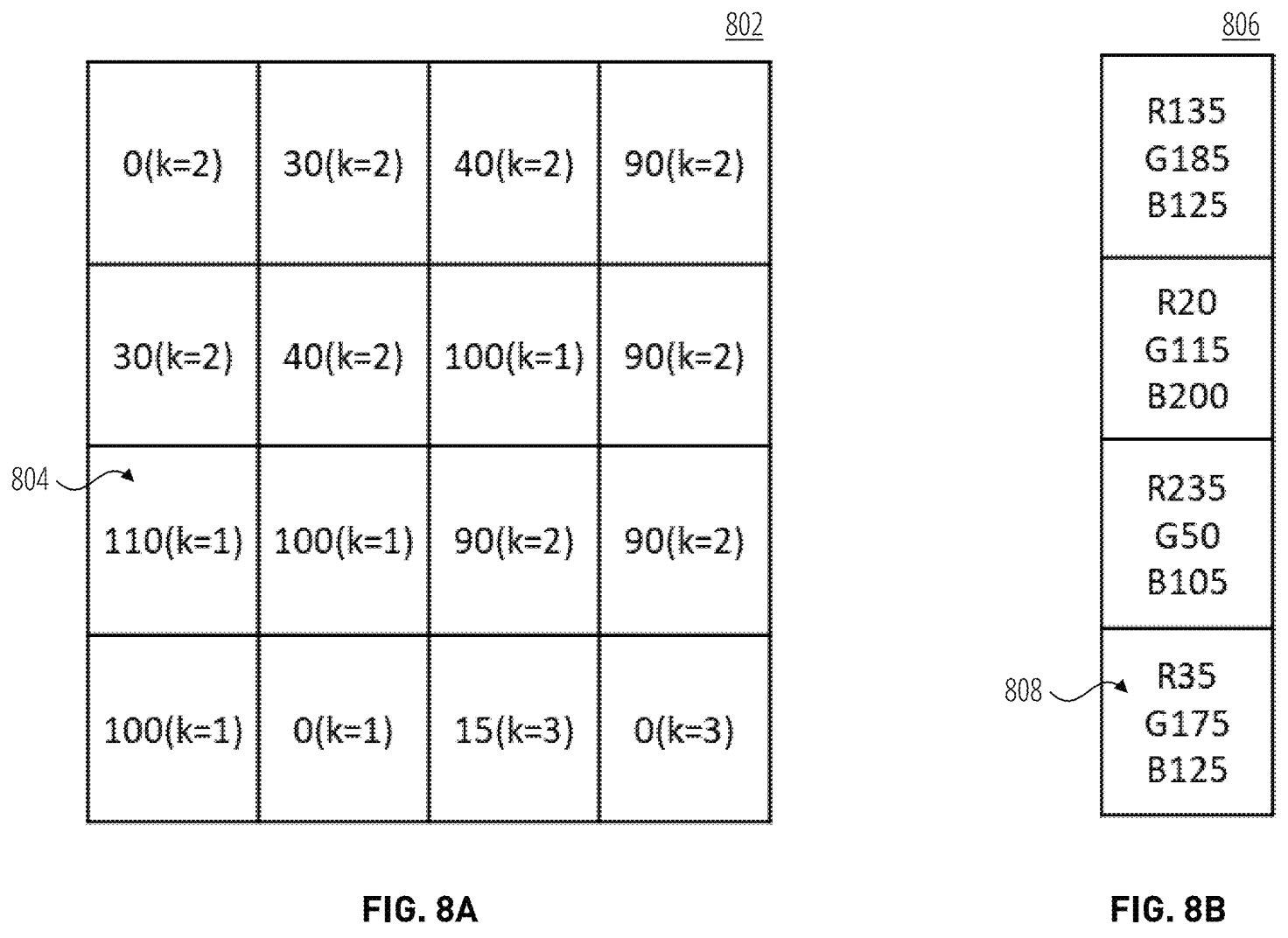

806

| | | | |
|---|---|---|---|
| R135 G185 B125 | R20 G115 B200 | R235 G50 B105 | R35 G175 B125 |

| 0(k=2) | 30(k=2) | 40(k=2) | 90(k=2) |
|---|---|---|---|
| 30(k=2) | 40(k=2) | 100(k=1) | 90(k=2) |
| 110(k=1) | 100(k=1) | 90(k=2) | 90(k=2) |
| 100(k=1) | 0(k=1) | 15(k=3) | 0(k=3) |

| | | | |
|---|---|---|---|
| 0(k=2) | 30(k=2) | 40(k=2) | 80(k=4) |
| 30(k=2) | 40(k=2) | 10(k=4) | 80(k=4) |
| 0(k=4) | 10 (k=4) | 80(k=4) | 80(k=4) |
| 10 (k=4) | 0(k=1) | 15(k=3) | 0(k=3) |

| 28(k=2) | 6(k=2) | 12(k=2) | 38(k=4) |
|---|---|---|---|
| 6(k=2) | 12(k=2) | 38(k=4) | 38(k=4) |
| 44(k=4) | 38 (k=4) | 38(k=4) | 38(k=4) |
| 52 (k=4) | 0(k=1) | 7(k=3) | 8(k=3) |

<u>1002</u>

| R135<br>G185<br>B125 | R30<br>G131<br>B202 | R230<br>G50<br>B108 | R43<br>G176<br>B160 |
|---|---|---|---|

1004

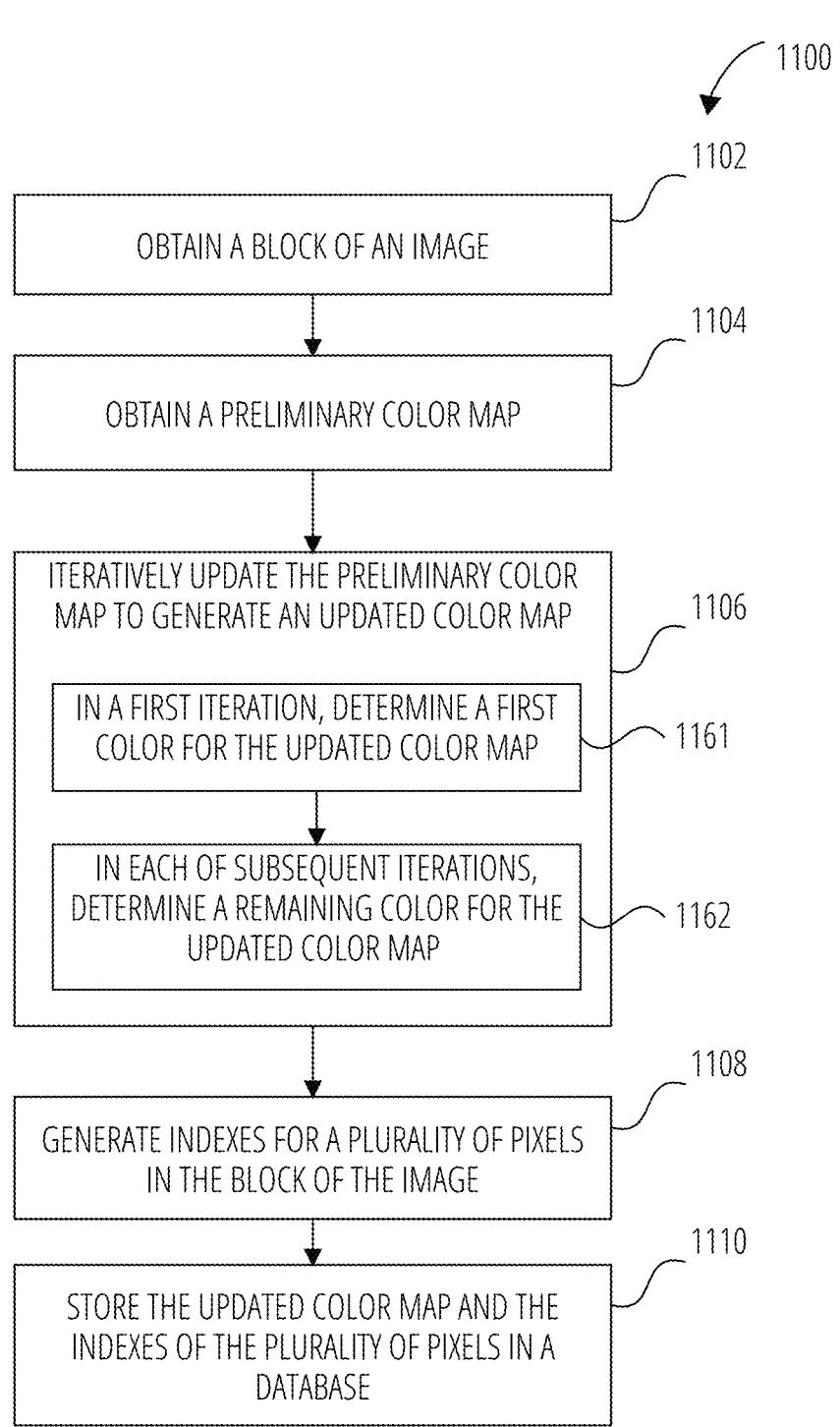

1100

1102
OBTAIN A BLOCK OF AN IMAGE

1104
OBTAIN A PRELIMINARY COLOR MAP

1106
ITERATIVELY UPDATE THE PRELIMINARY COLOR MAP TO GENERATE AN UPDATED COLOR MAP

1161
IN A FIRST ITERATION, DETERMINE A FIRST COLOR FOR THE UPDATED COLOR MAP

1162
IN EACH OF SUBSEQUENT ITERATIONS, DETERMINE A REMAINING COLOR FOR THE UPDATED COLOR MAP

1108
GENERATE INDEXES FOR A PLURALITY OF PIXELS IN THE BLOCK OF THE IMAGE

1110
STORE THE UPDATED COLOR MAP AND THE INDEXES OF THE PLURALITY OF PIXELS IN A DATABASE

FIG. 11

TEXTURE COMPRESSION METHOD

CROSS-REFERENCE TO RELATED APPLICATIONS

This application claims priority to and incorporates by reference Chinese application no. 202410526066.8 filed 28 Apr. 2024.

TECHNICAL FIELD

The present disclosure generally relates to image compression. In particular, example embodiments of the present disclosure address systems and methods for effectively compressing an image with low bandwidth and memory requirements while retaining a high quality.

BACKGROUND

The digital age has experienced an exponential growth in the volume of data being generated, transmitted, and stored. Among the data types, images and videos constitute a significant portion. However, raw digital images require vast amounts of storage space and bandwidth, which often makes it impractical to store and/or transmit them in their original form. Image compression addresses this challenge by reducing the size of the images.

Texture compression is a specialized sub-field of image compression. Textures, which are images mapped onto 3D surfaces to add details and realism, are crucial to graphics rendering. Storing high-resolution textures in their raw form can consume vast memory and bandwidth resources, especially during real-time rendering. Texture compression techniques aim to reduce the size of these textures, ensuring smooth graphics performance. However, the classic texture compression methods, such as Adaptive Scalable Texture Compression (ASTC), Block Compression (BC), Ericsson Texture Compression (ETC) all have very complex encoding and decoding processes and requires significant memory. While devices like tablets and cell phones can handle these compression methods, embedded systems with limited processing power, memory, and storage often cannot.

SUMMARY

A method of texture compression is provided. The method includes obtaining a block of an image. The block of the image includes a plurality of pixels. The method further includes obtaining a preliminary color map. The preliminary color map may include a preliminary color. The method further includes iteratively updating the preliminary color map to generate an updated color map. The iterative updating of the preliminary color map may include in a first iteration, determining a first color for the updated color map based on the preliminary color and colors of the plurality of pixels and in each of subsequent iterations, determining a remaining color for the updated color map based on determined colors in the updated color map in preceding iterations and the colors of the plurality of pixels. The method further includes generating indexes for the plurality of pixels, wherein each of the plurality of pixels has an index pointing to either the first color or one of the remaining colors in the updated color map. The method further includes storing the updated color map and the indexes of the plurality of pixels as a representation of the block of the image.

A computing apparatus is provided. The computing apparatus includes a processor; and a memory. The memory stores instructions that, when executed by the processor, configure the computing apparatus to obtain a block of an image. The block of the image includes a plurality of pixels. The instructions further configure the computing apparatus to obtain a preliminary color map. The preliminary color map includes a preliminary color. The instructions configure the computing apparatus to iteratively update the preliminary color map to generate an updated color map. To iteratively update the preliminary color, the instructions configure the computing apparatus to in a first iteration, determine a first color for the updated color map based on the preliminary color and colors of the plurality of pixels and in each of subsequent iterations, determine a remaining color for the updated color map based on determined colors in the updated color map in preceding iterations and the colors of the plurality of pixels. The instructions further configure the computing apparatus to generate indexes for the plurality of pixels. Each of the plurality of pixels has an index pointing to either the first color or one of the remaining colors in the updated color map. The instructions further configure the computing apparatus to store the updated color map and the indexes of the plurality of pixels as a representation of the block of the image.

A non-transitory computer-readable storage medium is provided. The computer-readable storage medium includes instructions that when executed by a computer, cause the computer to obtain a block of an image. The block of the image includes a plurality of pixels. The instructions further cause the computer to obtain a preliminary color map. The preliminary color map includes a preliminary color. The instructions further cause the computer to iteratively update the preliminary color map to generate an updated color map. To iteratively update the preliminary color map, the instructions cause the computer to in a first iteration, determine a first color for the updated color map based on the preliminary color and colors of the plurality of pixels, and in each of subsequent iterations, determine a remaining color for the updated color map based on determined colors in the updated color map in preceding iterations and the colors of the plurality of pixels. The instructions further cause the computer to generate indexes for the plurality of pixels. Each of the plurality of pixels has an index pointing to either the first color or one of the remaining colors in the updated color map. The instructions further cause the computer to store the updated color map and the indexes of the plurality of pixels as a representation of the block of the image.

BRIEF DESCRIPTION OF THE DRAWINGS

To easily identify the discussion of any particular element or act, the most significant digit or digits in a reference number refer to the figure number in which that element or act is first introduced.

FIG. 3 illustrates an example block of an image, in accordance with some example embodiments.

FIG. 4A illustrates preliminary color difference thresholds of pixels in the block of the image, in accordance with some example embodiments.

FIG. 4B illustrates a preliminary color map, in accordance with some example embodiments.

FIGS. 5A, 6A, 7A, 8A, and 9 illustrate updated color difference thresholds for the pixels in the block of the image, in accordance with some example embodiments.

FIGS. 5B, 6B, 7B, and 8B illustrate updated color maps, in accordance with some example embodiments.

FIG. 11 is a flowchart illustrating operations of the embedded system in compressing a block of an image, in accordance with some example embodiments.

DETAILED DESCRIPTION

Figure 1:
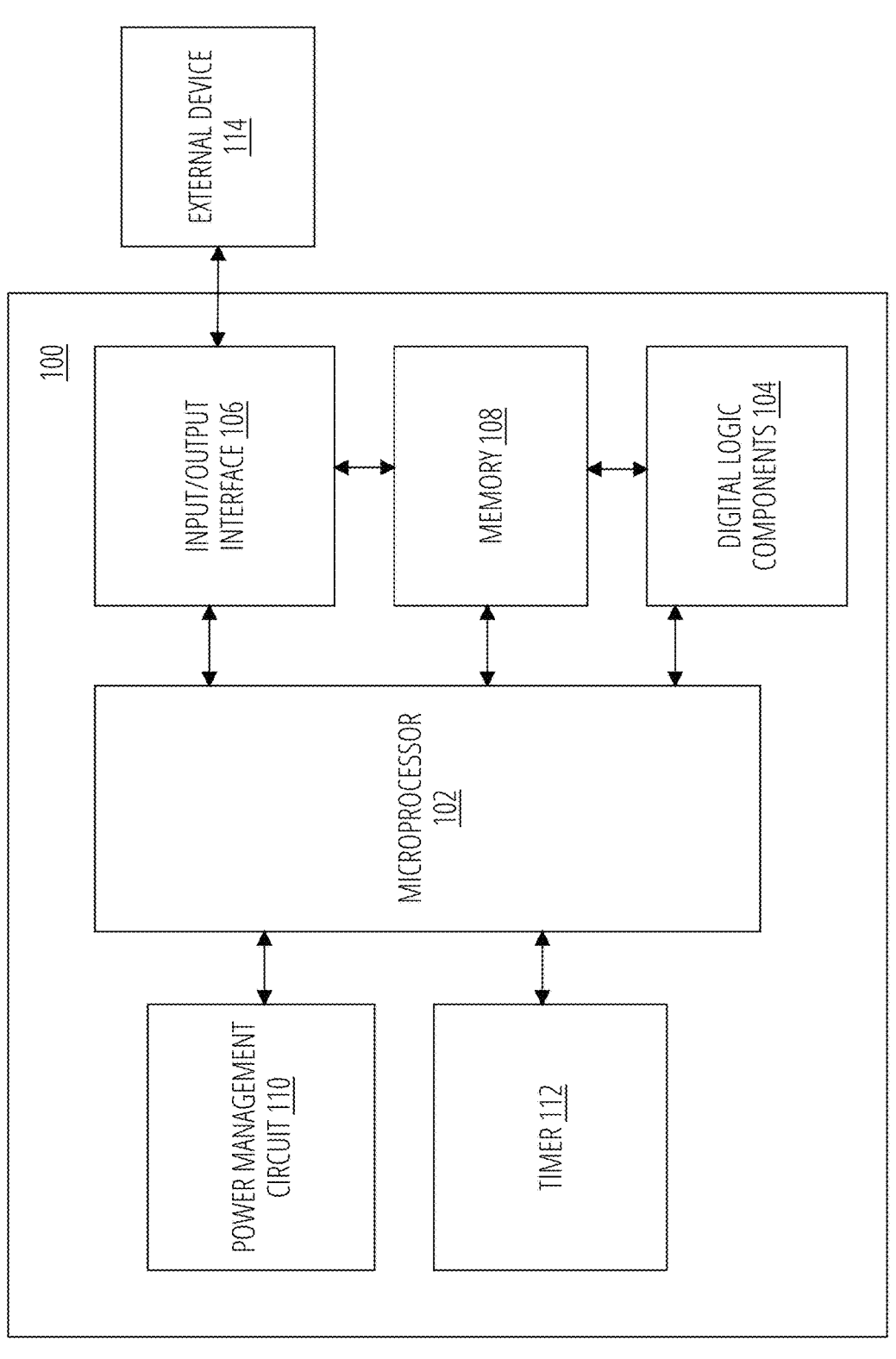
FIG. 1 is a block diagram illustrating an embedded system, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The present disclosure provides systems and methods for effectively compressing an image with low bandwidth and memory requirements while retaining a high quality. First, an original image is divided into multiple blocks. Each of the multiple blocks includes multiple pixels. Then a color map is iteratively updated based on a preliminary color in a preliminary color map, determined colors in an updated color map in preceding iterations, and colors of the multiple pixels in each block. Specifically, the colors in the color map are determined or updated to represent the most distinctive colors among the pixels in the block (colors with biggest color differences). An index is also determined for each pixel either during or after the iterations. The index of the pixel refers to a color in the updated color map that is most similar to the color of the pixel. Optionally, each of the colors in the updated color map can be further updated based on an average color of pixels that have the index pointing to the color. The updated color map and indexes of the pixels are stored as a compressed and encoded form of the block. The block can be recovered by searching and picking up colors from the updated color map according to the indexes of the pixels.

Compared with ASTC, BC7, and other texture compression techniques, the present method has lower complexity (e.g., mostly comparisons and summations of values), higher flexibility (e.g., size of blocks can be freely changed), faster encoding/decoding speed (e.g., indexes and color map are easy to be stored and read), lower power consumption, and lower memory usage (e.g., higher compression rate). Such advantages make the present method capable of being used in embedded systems. It should be noted that although the present method is primarily designed for embedded systems, it can also be used in other systems, devices, and platforms, with a highly competitive performance. For example, the average Peak Signal-to-Noise Ratio (PSNR) of compressed images using present method (6.0 bits per pixel, bpp) is only 3 dB lower than the average PSNR of compressed images using ASTC (6.4 bpp). Detailed test results can be found in FIGS. 13-17 and descriptions thereof. The present disclosure potentially has at least the following advantages:

1. Lower complexity: the present disclosure can be employed by less complex hardware circuits, such as comparators and adders.
2. Higher Flexibility: the division of blocks and the arrangement of pixels are flexible. Only the number of pixels in each block needs to be known.
3. Faster encoding/decoding speed: indexes and color map are easy to be stored and read, and consume less memory and storage.

Based on the above advantages, the present disclosure, unlike other texture compression methods, is compatible with embedded systems which have limited processing power, memory, and storage. Of course, the present method can also be used in other systems, devices, and platforms, with a highly competitive performance.

FIG. 1 is a block diagram illustrating an embedded system 100, in accordance with some example embodiments. As shown in FIG. 1, the embedded system 100 may include a microprocessor 102, digital logic components 104, an input/output interface 106, a memory 108, a power management circuit 110, and a timer 112. The embedded system 100 may be connected to an external device 114.

The microprocessor 102 is a compact electronic component that functions as the central unit of data processing. The microprocessor 102 processes the instructions from the embedded system 100's firmware or software, interacts with other hardware components, and controls the operations of the embedded system 100. Given the resource constraints and specific requirements of embedded system 100, the microprocessor 102 may be tailored for efficiency, consuming less power, occupying minimal space, and offering the precise functionality needed for the task they are designed to execute.

The digital logic components 104 are fundamental circuitry elements designed to interpret and produce binary signals. The digital logic components 104 serve as the backbone of data processing operations, interpreting inputs, executing logic, and generating outputs. The digital logic components 104 encompass a range of basic building blocks like logic gates (AND, OR, NOT, XOR, etc.), multiplexers, decoders, and arithmetic logic units (ALU). These units collaboratively ensure that the embedded system 100 functions correctly, responding in real-time to external commands or system instructions. In some examples, the digital logic components 104 are embedded in the microprocessor 102.

The digital logic components 104 may include comparators (and/or subtractors) to compare the magnitudes of two binary numbers that correspond to two difference colors. To accelerate the comparison between colors of multiple pixels in a block and a color in a color map, the count of comparators may be the same as or more than the count of pixels in the block such that colors of all the multiple pixels can be compared with colors in the color map simultaneously. Additionally, the digital logic components 104 may include adders and dividers that may collectively determine an average value of multiple binary numbers that correspond to multiple colors.

The input/output (I/O) interface 106 serves as the pivotal link between internal devices (e.g., microprocessor 102, memory 108) and external devices (e.g., external device 114). On the input side, the I/O interface 106 may be connected to an image sensor, an internal memory 108, an external storage device, or a communication port to acquire raw image data or pre-compressed image files. On the output side, the I/O interface 106 may transmit compressed image data to the internal memory 108, the external storage device, a display, or the communication port.

The memory 108 may store raw image data, pre-compressed image files, compressed and/or encoded image files, compression/decompression algorithms, encoding/decoding algorithms, color differences, color difference thresholds. The memory may include a combination of volatile and non-volatile memory components. Volatile memory, such as Random Access Memory (RAM), provides a rapid-access storage space for the temporary storage of raw image data, intermediate compression results, and the necessary compression algorithms or look-up tables. This ensures that the microprocessor 102 or digital logic components 104 can quickly access and manipulate data during the compression. On the other hand, non-volatile memory, such as Flash or EEPROM, stores the firmware and user settings that dictate how the embedded system 100 functions.

The power management circuit 110 is designed to ensure efficient energy consumption. The power management circuit 110 may include power regulators and controllers that dynamically adjust the voltage and current levels based on the image compression progress. The power management circuit 110 may cause the embedded system 100 to enter a power saving mode when the image compression is completed.

The timer 112 ensures that specific operations occur at precise intervals, allowing for efficient pipelining of tasks. Furthermore, the timer 112 can trigger events or generate interrupts based on predefined intervals, ensuring that the image compression process is both timely and synchronized with other system operations.

The external device 114 may include but is not limited to an image sensor, a camera, an external storage (such as a hard disk, a server, a database), and a display.

It should be noted that the embedded system 100 is for illustrative purpose and shall not be limiting. Components in the embedded system 100 may be combined, altered, or omitted. Extra components can be included in the embedded system 100. It should also be noted that the present disclosure can be employed by other types of systems such as tablets, cell phones, computers, and servers. Such applications are also within the protection scope of the present disclosure.

Figure 2:
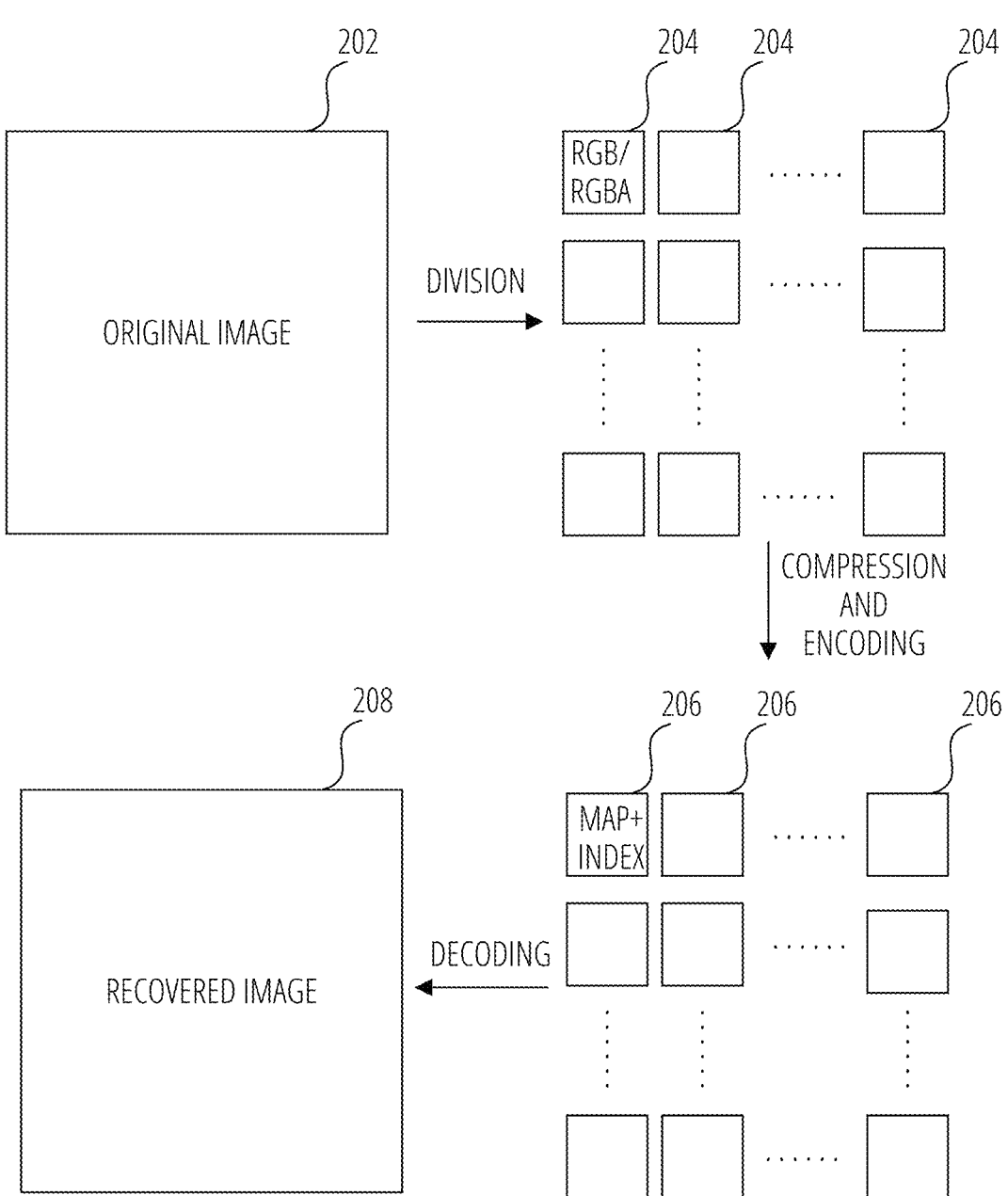
FIG. 2 is a schematic diagram illustrating an example process of texture compression, in accordance with some example embodiments.

FIG. 2 is a schematic diagram illustrating an example process of texture compression, in accordance with some example embodiments.

To begin with, an original image 202 is divided into multiple blocks 204. The blocks 204 can be of any sizes, including but are not limited to 4*4 pixels, 4*8 pixels, 8*4 pixels, 8*8 pixels, 12*12 pixels, 16*8 pixels, 16*16 pixels, etc. For example, a Full High Definition (FHD) original image of 1920*1080 pixels may be divided into 32,400 blocks of 8*8 pixels.

In some examples, the size of the blocks 204 may be same as the hardware processing capacity of the embedded system 100, for example, the number of comparators in the digital logic components 104. If there are 64 comparators in the digital logic components 104, the blocks may be 8*8, 4*16, or 16*4 so that all the pixels in a block 204 can be processed at the same time. However, this shall not be limiting.

Each pixel may be represented by multiple channels or in a certain color format, such as Red, Green, Blue (RGB), Red, Green, Blue, Alpha/Transparency (RGBA), greyscale, High Dynamic Range (HDR), Cyan, Magenta, Yellow, Key/Black (CMYK), Hue, Saturation, Brightness (HSB), etc.

Then each of the blocks 204 is compressed and encoded into a compressed block 206. Each compressed block 206 includes two parts: a color map including multiple colors and multiple indexes that point to the corresponding colors in the color map. In some examples, a block of 8*8 pixels represented in RGB format is compressed into 16 colors. In such scenarios, the original block uses 1536 bits (8*8*24). The encoded color map uses 384 bits (16*24). The encoded indexes use 256 bits (4*8*8). Accordingly, the compression rate is 1536/(384+256)=2.4.

Based on test results, the present method can compress one pixel per clock cycle. This enables the embedded system 100 to compress a 25-frame Full High Definition (FHD) video in near real time.

Finally, the compressed blocks 206 may be decoded and combined to form a recovered image 208. Specifically, the compressed blocks 206 are decoded to their formats before the compression, such as RGB, RGBV. For example, each pixel's color is determined by searching and pick up a color from the color map according to the corresponding index. The recovered image will have the same resolution as the original image, but with fewer numbers of different colors. Detailed example of the process of texture compression can be found in FIGS. 3-10 and the descriptions thereof.

FIG. 3 illustrates an example block of image, in accordance with some example embodiments. To begin with, an image is divided into multiple blocks. Each block may include multiple pixels, e.g., M*N pixels. The size of the blocks is determined based on the hardware processing capacity of the embedded system 100, such as the number of comparators in the digital logic components 104. As shown in FIG. 3, the block 302 includes 16 pixels (4*4). Each of the 16 pixels has a color represented by a combination of a red value, a green value, and a blue value. Specifically, the red value, green value, and blue value each ranges from 0 to 255. For example, a black color is represented by R0G0B0 (or referred to as #000000, (0, 0, 0)) and a white color is represented by R255G255B255 (or referred to as #FFFFFF, (255, 255, 255)).

FIG. 4A illustrates preliminary color difference thresholds of pixels in the block 302, in accordance with some example embodiments. It should be noted that the matrix 402 is merely for the illustrative purpose and the color difference threshold is associated with each pixel independently. In some examples, the preliminary color difference threshold for each pixel is the maximum color difference between any two colors, such as between black (R0G0B0) and white (R255G255B255), or 768 (256*3).

FIG. 4B illustrates a preliminary color map 404, in accordance with some example embodiments. The preliminary color map 404 may include a preliminary color. For example, the preliminary color is black (R0G0B0). The size of the preliminary color map 404 is unchanged after updating and it decides the maximum number of different colors after compression. Since there are 4 slots in the preliminary color map 404, a compressed image will include at most 4 different colors. The size or number of slots in the preliminary color map 404 may be 4, 8, 16, or 32, but is not limiting.

FIGS. 5A, 6A, 7A, 8A and 9 illustrate updated color difference thresholds for the pixels in the block, in accordance with some example embodiments. FIGS. 5B, 6B, 7B, and 8B illustrate updated color maps, in accordance with some example embodiments. Matrix 502 includes an updated color difference threshold for each pixel. Specifically, in the first iteration, a color difference threshold is updated to be a smaller value between the previous color difference threshold (also referred to as a D value) and a color difference between the preliminary color and the color of the pixel (also referred to as a d value). The color difference between the preliminary color and the color of the pixel is measured by a color distance between them, including but is not limited to a Manhattan distance, a Euclidean distance, a Chebyshev Distance, or the like, or any combination thereof.

For example, the color difference d(i,j) can be determined by a Manhattan distance as:

$$d(i,j)=|X_{ijR}-M_{kR}|+|X_{ijG}-M_{kG}|+|X_{ijB}-M_{kB}| \qquad (1)$$

where i denotes a row number of the pixel, j denotes a column number of the pixel, k denotes an index of color in the color map, X denotes a color of the pixel, and M denotes a color in the color map. For example, $|X_{ijR}-M_{kR}|$ denotes an absolute value of a difference between the red value of the pixel in the $i^{th}$ row and $j^{th}$ column and the red value of the $k^{th}$ color in the color map.

As another example, the color difference d(i,j) can be determined by a modified Manhattan distance as:

$$d(i,j)=dtr+dtg+dtb+(|dtr-dtg|+|dtr-dtb|+|dtg-dtb|)/2 \qquad (2)$$

where $dtr=|X_{ijR}-M_{kR}|$, $dtg=|X_{ijG}-M_{kG}|$, and $dtb=|X_{ijB}-M_{kB}|$.

Figures 5A, 5B:
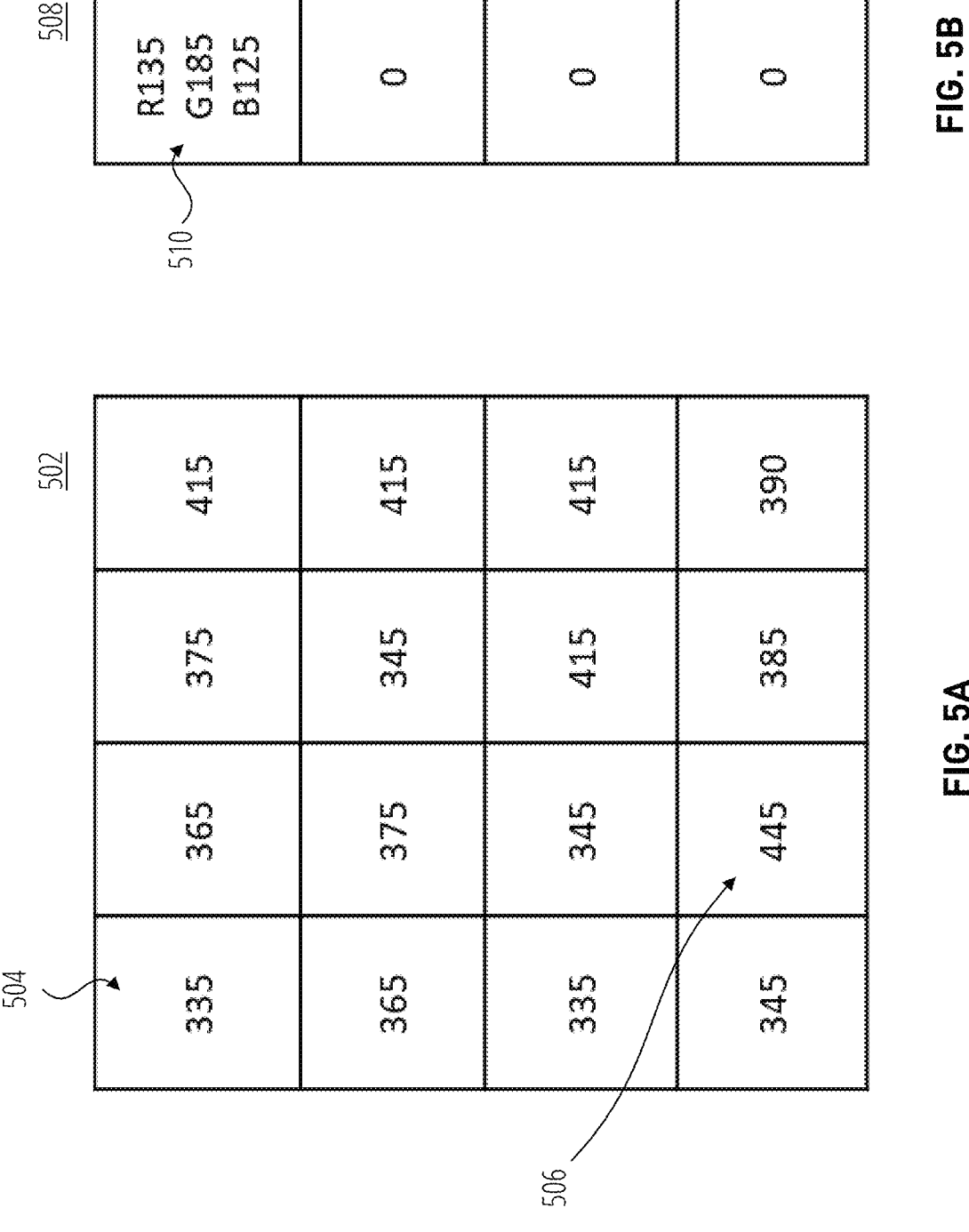

Referring to FIG. 5A, a color difference between the preliminary color (R0G0B0) and the color of the pixel in the $1^{st}$ row, $1^{st}$ column (R20G115B200) is first determined. Assuming the Manhattan distance (e.g., equation (1)) is used, the color difference is |20−0|+|115−0|+|200−0|=335. Then the color difference (335) is compared with the color difference threshold (768). Since the color difference (335) is less than the color difference threshold (768), the color difference threshold 504 is updated to 335. Similarly, for pixel in the $4^{th}$ row, $2^{nd}$ column (R135G185B125), the color difference is |135−0|+|185−0|+|125−0|=445. Since the color difference (445) is less than the color difference threshold (768), the color difference threshold 506 is updated to 445.

After updating all the color difference thresholds in the matrix 502, the biggest value (445) is found, and the corresponding color (R135G185B125) is designated as the first color 510 in the updated color map 508. The color difference threshold of each pixel is continuously updated in the subsequent iterations based on the newly determined colors in the updated color map 508. The iteration ends when all colors in the color map and the corresponding color difference thresholds are traversed and/or updated.

Referring to FIG. 6A, a matrix 602 including an updated color difference threshold for each pixel is determined in a second iteration. For example, a color difference between the first color (R135G185B125) determined in the first iteration and the color of the pixel in the $1^{st}$ row, $1^{st}$ column (R20G115B200) is determined. Assuming that the Manhattan distance (e.g., equation (1)) is used, the color difference is |135−20|+|185−115|+|125−200|=260. Since the color difference (260) is less than the color difference threshold (335), the color difference threshold 604 is updated to 260. Similarly, for pixel in the $1^{st}$ row, $2^{nd}$ column (R30G135B200), the color difference is |135−30|+|185−135|+|125−200|=230. Since the color difference (230) is less than the color difference threshold (365), the color difference threshold 606 is updated to 230. If the color difference is less than the color difference threshold, an index of the pixel is also updated to point to the color in the color map.

After updating all the color difference thresholds in the matrix 602, the biggest value (260) is found, and the corresponding color (R20G115B200) is designated as the second color 610 in the updated color map 608.

Figures 7A, 7B:
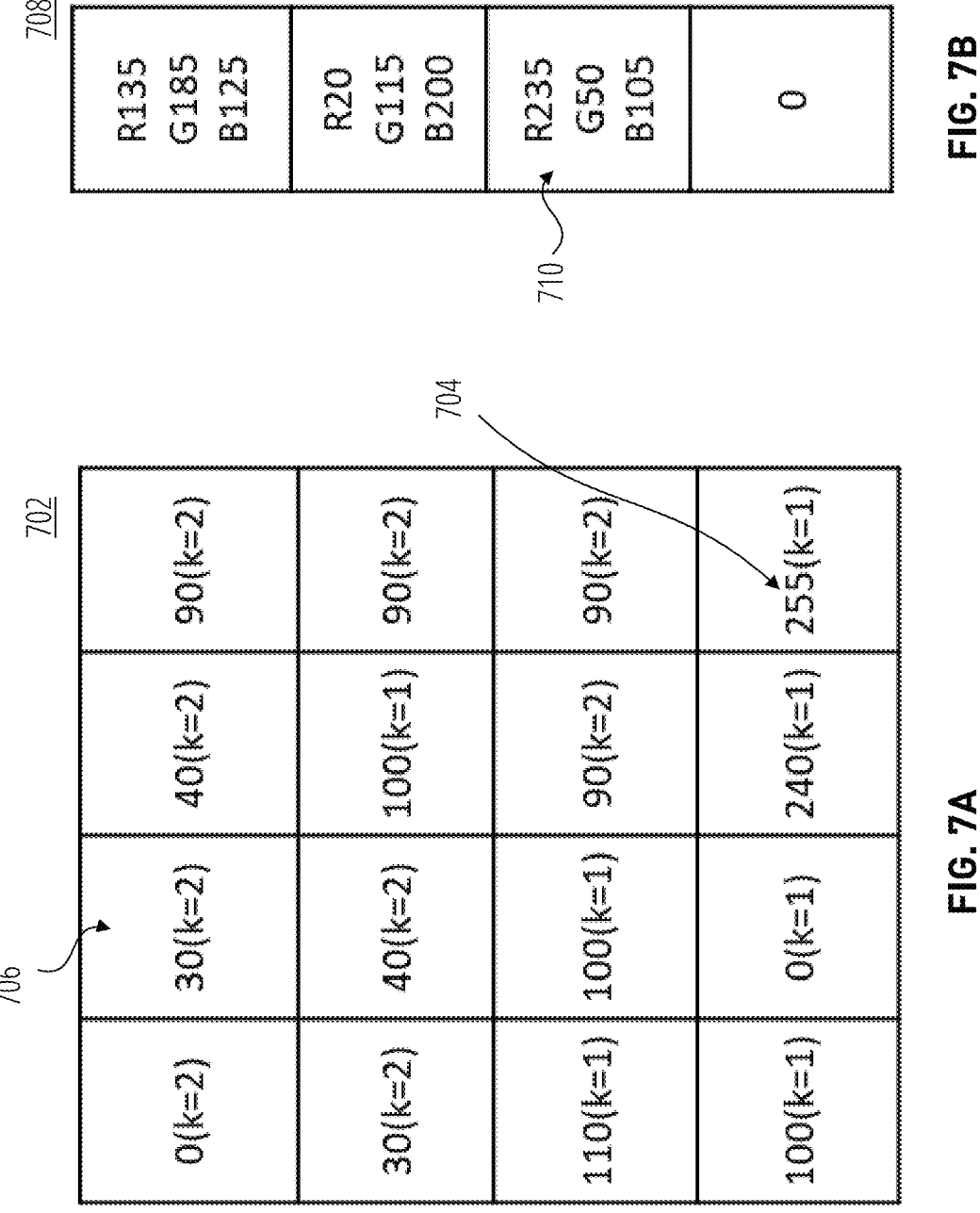

Referring to FIG. 7A, a matrix 702 including an updated color difference threshold for each pixel is determined in a third iteration. For example, a color difference between the second color (R20G115B200) determined in the second iteration and the color of the pixel in the $4^{th}$ row, $4^{th}$ column (R235G50B105) is determined. Assuming the Manhattan distance (e.g., equation (1)) is used, the color difference is |20−235|+|115−50|+|200−105|=375. Since the color difference (375) is not less than the color difference threshold (255), the color difference threshold 704 remains unchanged. The index of the pixel also remains unchanged. In contrast, for pixel in the $1^{st}$ row, $3^{rd}$ column (R35G135B205), the color difference is |35−20|+|135−115|+|205−200|=40. Since the color difference (40) is less than the color difference threshold (230), the color difference threshold 706 is updated to 40 and the index of the pixel is updated to 2, pointing to the second color in the color map.

After updating all the color difference thresholds in the matrix 702, the biggest value (255) is found, and the corresponding color (R235G50B105) is designated as the third color 710 in the updated color map 708.

Referring to FIG. 8A, a matrix 802 including an updated color difference threshold for each pixel is determined in a fourth iteration. Similarly, the color difference threshold of the pixels is updated in the fourth iteration. For example, a color difference between the third color (R235G50B105) determined in the third iteration and the color of the pixel in the $3^{rd}$ row, $1^{st}$ column (R35G175B125) is determined to be 345 (|35−235|+|175−50|+|125−105|). Since the color difference (345) is not less than the color difference threshold (110), the color difference threshold 804 and index of the pixel remain unchanged. After updating all the color difference thresholds in the matrix 802, the biggest value (110) in the matrix 802 is found and the corresponding color (R35G175B125) is designated as the fourth and last color 808 in the updated color map 806.

Referring to FIG. 9, a matrix 902 including an updated color difference threshold for each pixel is determined in an optional fifth iteration. Similar to the previous iterations, the color difference threshold for each pixel is either updated to a smaller value or kept unchanged. For example, the color difference threshold 904 for the pixel in the $4^{th}$ row, $1^{st}$ column is updated to 10 and the index of the same pixel is updated to 4, pointing to the fourth color in the color map.

Figures 10A, 10B:
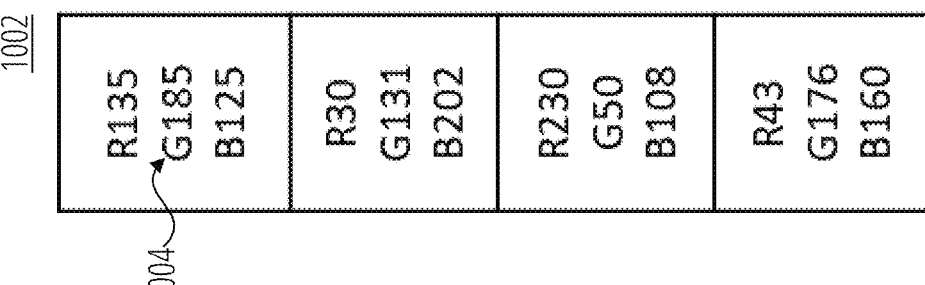
FIG. 10A illustrates an averaged color map, in accordance with some example embodiments.
FIG. 10B illustrates updated color difference thresholds and indexes of the pixels corresponding to the averaged color map, in accordance with some example embodiments.

FIG. 10A illustrates an averaged color map 1002, in accordance with some example embodiments. The averaged color map 1002 may be determined by further updating colors in the updated color map 806. Specifically, each of the colors in the updated color map 806 is replaced by an average color of all pixels with index pointing to it.

For example, the second color 1004 is updated based on the average color of pixels with an index of 2, including the pixel in the $1^{st}$ row, $1^{st}$ column, the pixel in the $1^{st}$ row, $2^{nd}$ column, the pixel in the $1^{st}$ row, $3^{rd}$ column, the pixel in the $2^{nd}$ row, $1^{st}$ column, and the pixel in the $2^{nd}$ row, $2^{nd}$ column. The average red value is (20+30+35+30+35)/5=30; the average green value is (115+135+135+135+135)/5=131; and the average blue value is (200+200+205+200+205)/5=202. Accordingly, the second color 1004 is updated to R30G131B202.

As the colors in the updated color map 806 may potentially be different from the colors in the averaged color map 1002, it may be necessary to verify whether the indexes of the pixels need to be changed. If the indexes of the pixels are changed, the color map 1002 also needs to be updated. The indexes and the color map are iteratively updated until they converge. FIG. 10B illustrates updated color difference thresholds and indexes of the pixels corresponding to the averaged color map 1002. Since the indexes of pixels in matrix 1006 are the same as those in 902, no further update is needed.

The original block of image 302 can be compressed and converted/encoded into binary numbers of two parts: RGB values of colors in the averaged color map 1002 and indexes in the matrix 1006. Specifically, first part of the compressed and encoded image begins with 1000011110111001 that corresponds to red value (135) and green value (185) of the first color in the averaged color map 1002. The second part of the compressed and encoded image begins with 10111001 that corresponds to the indexes of the four pixels in the first row (2, 2, 2, 4). The block of image 302 may be recovered (or decoded) and displayed by searching and picking up corresponding colors in the color map according to the indexes. Since the compression is lossy, the recovered image contains less information (e.g., fewer different colors).

To be clear, if the original block is in a format of RGB888, the first part of the compressed and encoded image includes K*8*3 bits, wherein K denotes a size of the color map. If the original block is in a format of RGBA8888, the first part of the compressed and encoded image includes K*8*4 bits. If the original block is in a format of RGB565/RGBA5551, the first part of the compressed and encoded image includes K*8*2 bits. If the original block is in a format of HDR, the first part of the compressed and encoded image includes K*10*2 bits. The second part of the compressed and encoded image includes M*N*log 2(K) bits. For the original block 302, the compressed and encoded image will include 4*8*3+4*4*log 2 (4)=128 bits or 8 bpp. The compression rate is 16*8*3/128=3.

In some examples, if the original block is in a format of RGB565, the red value $X_R$ of colors in the updated color map can be updated to int $(X_R/8-X_R/512)*(8+1/4)$, to achieve an even better visual effect. For example, a red value of 233 is updated to int $(233/8-233/512)*(8+1/4)$, or 236.

FIG. 11 is a flowchart illustrating operations of the embedded system 100 in compressing a block of an image, in accordance with some example embodiments. The method 1100 may be embodied in computer-readable instructions for execution by one or more processors such that operations of the method 1100 may be performed in part or in whole by the functional components of the embedded system 100; accordingly, the method 1100 is described below by way of example with reference thereto. However, it shall be appreciated that at least some of the operations of the method 1100 may be deployed on various other hardware configurations than the embedded system 100. Also, the operations of the method 1100 may be partially omitted, or performed in any order.

In operation 1102, the embedded system 100 may obtain a block of an image. In some examples, an original image is divided into multiple blocks. The blocks can be of any sizes, including but are not limited to 4*4 pixels, 4*8 pixels, 8*4 pixels, 8*8 pixels, 12*12 pixels, 16*8 pixels, 16*16 pixels, etc. For example, a Full High Definition (FHD) original image of 1920*1080 pixels may be divided into 32,400 blocks of 8*8 pixels. The operation 1102 may include obtaining a block of 8*8 pixels among the 32,400 blocks. It should be noted that the method 1100 illustrates operations performed on one of the multiple blocks. However, the same method 1100 can be performed subsequentially or concurrently on other blocks of the same image. The compressed image data (e.g., indexes and color map) of different blocks are combined to represent compressed and/or encoded image data corresponding to the original image.

In some examples, each pixel of the block has a color represented in a color format, such as RGB, RGBA, greyscale, HDR, CMYK, HSB, etc.

In operation 1104, the embedded system 100 may obtain a preliminary color map. The preliminary color map includes a preliminary color. The size of the preliminary color map is unchanged after updating and it decides the maximum number of different colors after compression.

In operation 1106, the embedded system 100 may iteratively update the preliminary color map to generate an updated color map. Specifically, the operation 1106 may include two suboperations 1161 and 1162.

In suboperation 1161, the embedded system 100 may determine, in a first iteration, a first color for the updated color map. In some examples, the embedded system 100 compares a color difference between each of the pixels in the block and the preliminary color in the preliminary color map. The color difference may be determined based on a Manhattan distance (e.g., equation (1)) or a modified Manhattan distance (e.g., equation (2)) between the each of the pixels and the preliminary color. The embedded system 100 may identify a pixel with the biggest color difference and designate the color corresponding to the pixel as the first color in the updated color map.

In suboperation 1162, the embedded system 100 may determine, in each of subsequent iterations, a remaining color for the updated color map. In some examples, the embedded system 100 may first determine, for each of pixels of the block, a minimum color difference between a color of the pixel and the colors in the updated color map determined in all the preceding iterations. A method to determine the minimum color difference includes comparing the color difference with a color difference threshold that has been updated iteratively based on color differences in the preceding iterations. The embedded system 100 may then determine, among pixels, a target pixel that has a biggest minimum color difference and designate the color of the target pixel as the remaining color of the updated color map in each iteration.

In operation 1108, the embedded system 100 may generate indexes for the pixels in the block of the image. The index of a pixel may point to a color in the color map that is more similar to the color of the pixel than other colors in the color map. For example, the index of the pixel is iteratively updated. In an iteration when the color difference between the pixel and the color in the color map is less than a color difference threshold in the preceding iteration, the index of the pixel is updated to point to the corresponding color in the color map in that iteration.

In operation 1110, the embedded system 100 may store the updated color map and the indexes of the plurality of pixels as a representation (e.g., a compressed and encoded form) of the block of the image. The block can be recovered by searching and picking up colors in the updated color map according to the indexes of pixels. The recovered block has the same resolution (size) as the original block but contains fewer different colors.

It should be noted that method 1100 illustrates example operations of the present disclosure. Modifications can be made to the method 1100 and are within the protection scope of the present disclosure. For example, the updated color map may be further updated based on an average color of pixels corresponding to each color in the updated color map. As another example, when a count of pixels having the same index exceeds a threshold or when an average color difference among pixels having the same index exceeds a threshold, the updated color map may be further updated. Details regarding such modifications may be found in FIG. 12 and descriptions thereof.

Figure 12:
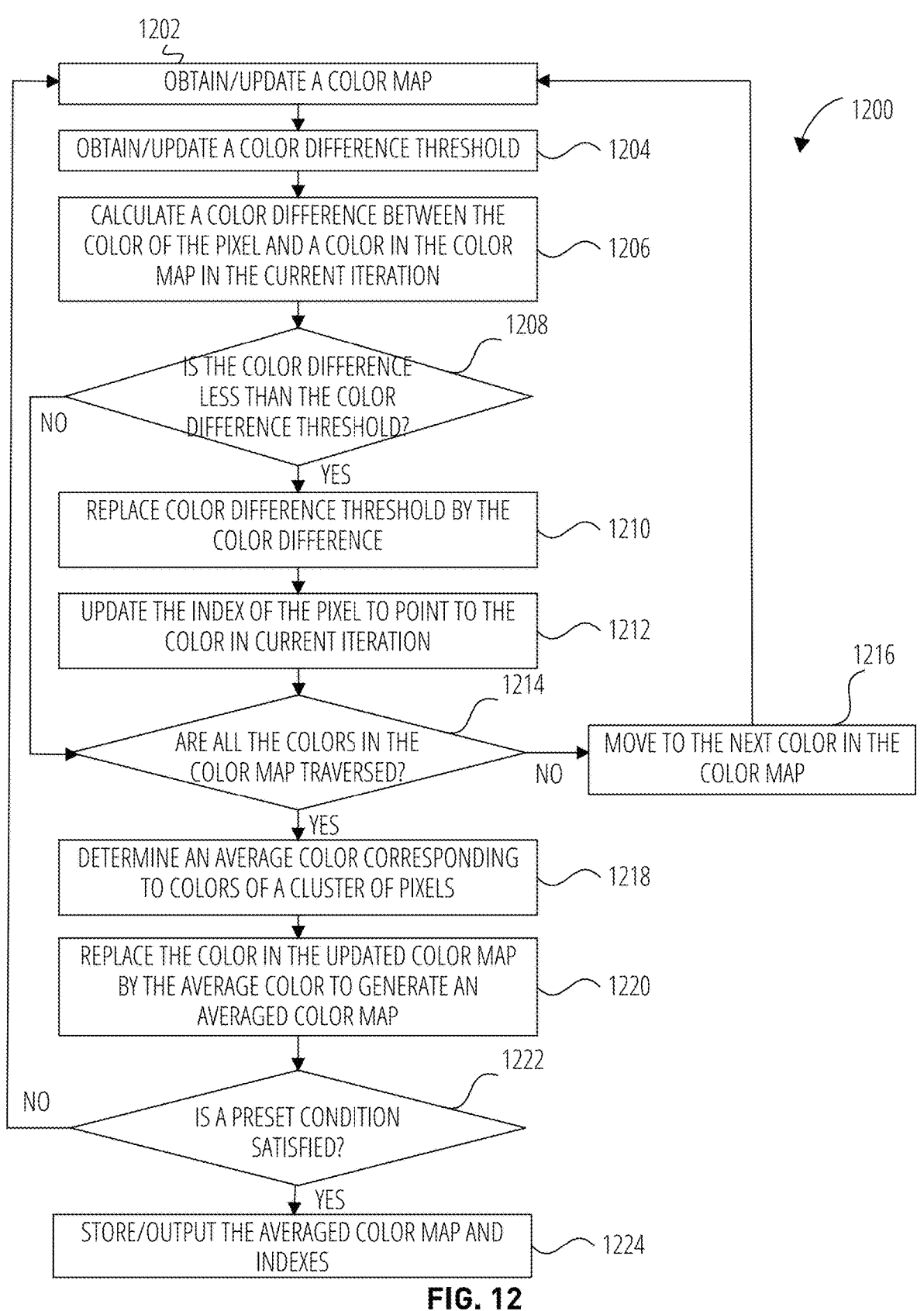
FIG. 12 is a flowchart illustrating operations of the embedded system in compressing a block of an image, in accordance with some example embodiments.

FIG. 12 is a flowchart illustrating operations of the embedded system 100 in compressing a block of an image, in accordance with some example embodiments. The method 1200 may be embodied in computer-readable instructions for execution by one or more processors such that operations of the method 1200 may be performed in part or in whole by the functional components of the embedded system 100; accordingly, the method 1200 is described below by way of example with reference thereto. However, it shall be appreciated that at least some of the operations of the method 1200 may be deployed on various other hardware configurations than the embedded system 100. Also, the operations of the method 1200 may be partially omitted, or performed in any order.

In operation 1202, the embedded system 100 may obtain or update a color map. In the first iteration, the embedded system 100 may obtain a preliminary color map. In subsequent iterations, the embedded system 100 may update the preliminary color map or further update an updated color map in the preceding iteration.

In operation 1204, the embedded system 100 may obtain or update a color difference threshold. In the first iteration, the embedded system 100 may obtain a preliminary color difference threshold. In some examples, the preliminary color difference threshold is the maximum color difference between any two colors, such as a color difference between black and white. Example preliminary color difference threshold matrix can be found in FIG. 4A. In subsequent iterations, the embedded system 100 may update the color difference threshold.

In operation 1206, the embedded system 100 may calculate a color difference between the color of the pixel and a color in the color map in the current iteration. In some examples, the color difference between the color of the pixel and the color in the color map can be determined based on a color distance between them, including but is not limited to a Manhattan distance, a Euclidean distance, a Chebyshev Distance, or the like, or any combination thereof. Example calculations of the color difference can be found in equations (1) and (2).

In operation 1208, the embedded system 100 may determine whether the color difference is smaller than the color threshold. In response to a determination that the color difference is smaller than the color threshold, the method 1200 proceeds to operation 1210; otherwise, the method 1200 proceeds to operation 1214.

In operation 1210, the embedded system 100 may update the color difference threshold to be the color difference.

In operation 1212, the embedded system 100 may update the index of the pixel to point to the color in the color map in current iteration.

In operation 1214, the embedded system 100 may determine whether all the colors in the color map are traversed. In response to a determination that all the colors in the color map are traversed, the method 1200 proceeds to operation 1218; otherwise, the method 1200 proceeds to operation 1216, i.e., moving to the next color in the color map, and then proceeds back to operation 1202.

In some examples, pixels that have the same index is defined as in a same cluster. The embedded system 100 may determine, in any of operations 1202-1214, that an average color difference among pixels in a cluster is greater than a first threshold. The average color difference can be measured by a standard deviation of color distances, a variance of color distances, an average color distance, a biggest color distance, etc., among the pixels in the cluster. The embedded system 100 may also determine, in any of operations 1202-1214 that a count of pixels in a cluster is greater than a second threshold. In response to a determination of any of these two scenarios, the embedded system 100 may desire to include more colors of the pixels in the cluster as colors in the color map. Specifically, if the colors in the color map have been traversed, the last at least one color may be replaced by at least one color in the cluster. If the colors in the color map are not traversed, at least one color in the cluster may directly be designated as at least one remaining color in the color map. This operation can improve the quality of compression result especially in scenarios where the original block includes a large number of gradient colors in combination with a vast number of different colors.

In operation 1218, the embedded system 100 may determine an average color corresponding to colors of the clusters of pixels associated with each color in the updated color map. For example, the embedded system 100 may determine a cluster of pixels for each color in the updated color map. The colors of corresponding to pixels in each cluster is determined and averaged to generate the average color.

In operation 1220, the embedded system 100 may replace the color in the updated color map by the average color to generate an averaged color map. For example, each color in the updated color map is replaced by an average color of its corresponding cluster of pixels. In some examples, operations 1218 and 1220 are omitted.

In operation 1222, the embedded system 100 may determine whether a preset condition is satisfied. The preset condition may include that a count of iterations has been reached, properties such as indexes and color map have converged, a preset PSNR has reached, etc. In response to a determination that the preset condition is satisfied, the method 1200 proceeds to operation 1224; otherwise, the method 1200 proceeds back to operation 1202.

In operation 1224, the embedded system 100 may store or output the averaged color map and indexes as a representation (e.g., a compressed and encoded form) of the block of the image.

A recovered block of the image may be generated based on the averaged color map and indexes by searching and picking up colors from the averaged color map for the pixels based on indexes corresponding to the pixels.

Below is an example of method 1200:

A block of an image includes 64 pixels, e.g., X(1-64,rgb). The preliminary color map includes 8 slot, all of which are black, e.g., Map (1~8, 0). The color difference thresholds D (1~64) are 768 (3*256).

Step 1: 64 comparators compare color difference |X(1~64, rgb)−Map(1, rgb)| with color difference thresholds D, store smaller value in D to obtain new D (1~64). Find a location with biggest D, dm1, Map (1,rgb)=X(dm1,rgb).

Step 2:64 comparators compare color difference |X(1~64, rgb)−Map(1, rgb)| with color difference thresholds D, store smaller value in D to obtain new D (1~64). Find a location with biggest D, dm2, Map (2,rgb)=X(dm2,rgb). Continue to compare |X(1-64,rgb)−Map(2,rgb)| with color difference threshold D, store smaller value in D to obtain new D (1~64), increase index by 1. Find a location with biggest D, dm3, Map (3,rgb)=X(dm3,rgb).

Step 3: Repeating step 2 until dm 8 is found. At this moment, all Map and Index are found.

Step 4: Calculating an average color of pixel with index=1, store it in Map(1, rgb), calculate an average color of pixel with index=2, store it in Map(2,rgb). Repeating until Map(8,rgb) is updated. In other words, Map(k, rgb)=mean (X(index=k, rgb)). Then repeating steps 2-4 multiple times.

Step 5: Outputting the final Map and index as compressed image data.

Figure 13:
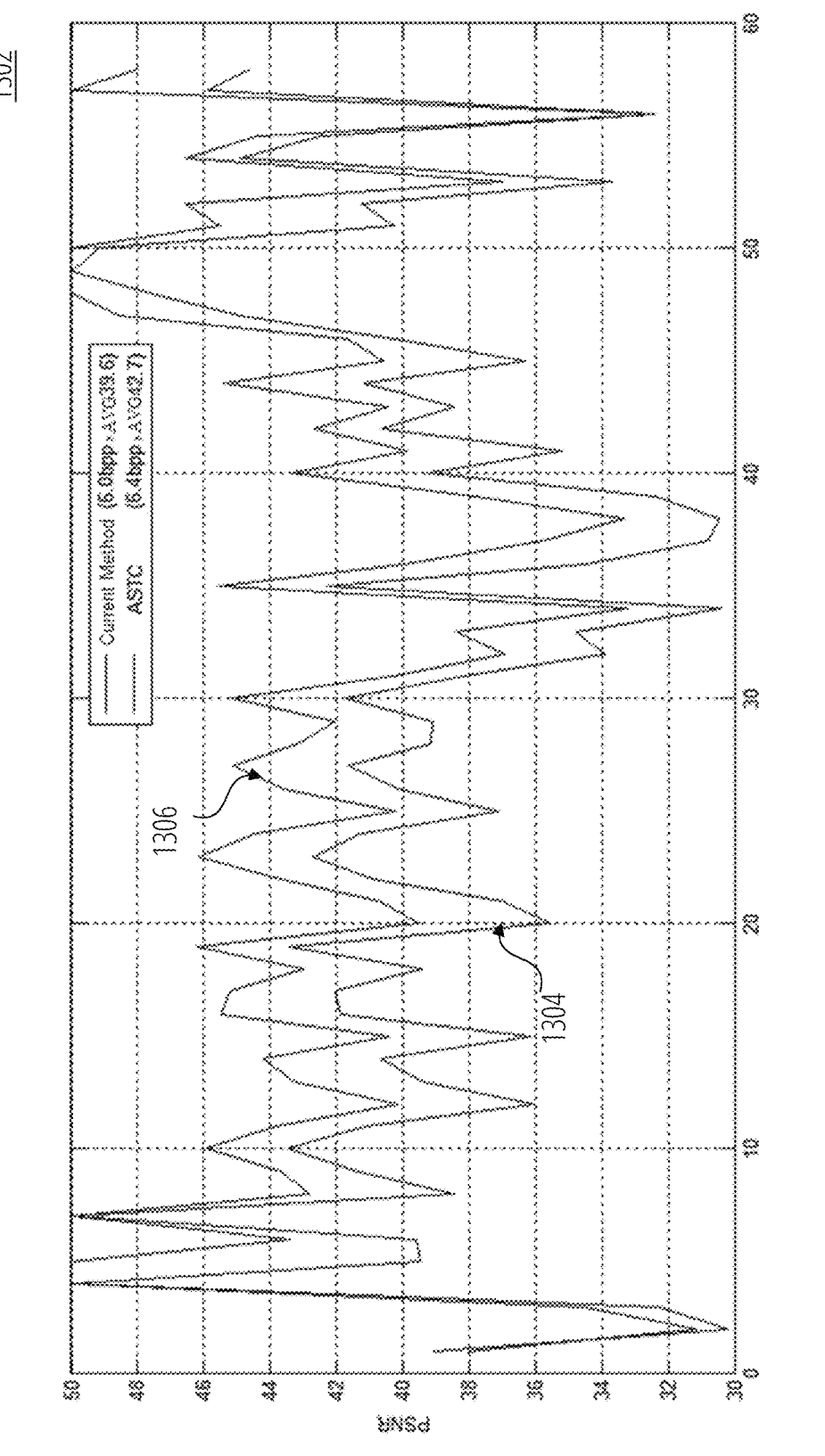
FIG. 13 illustrates an image compression result, in accordance with some example embodiments.
Figure 14:
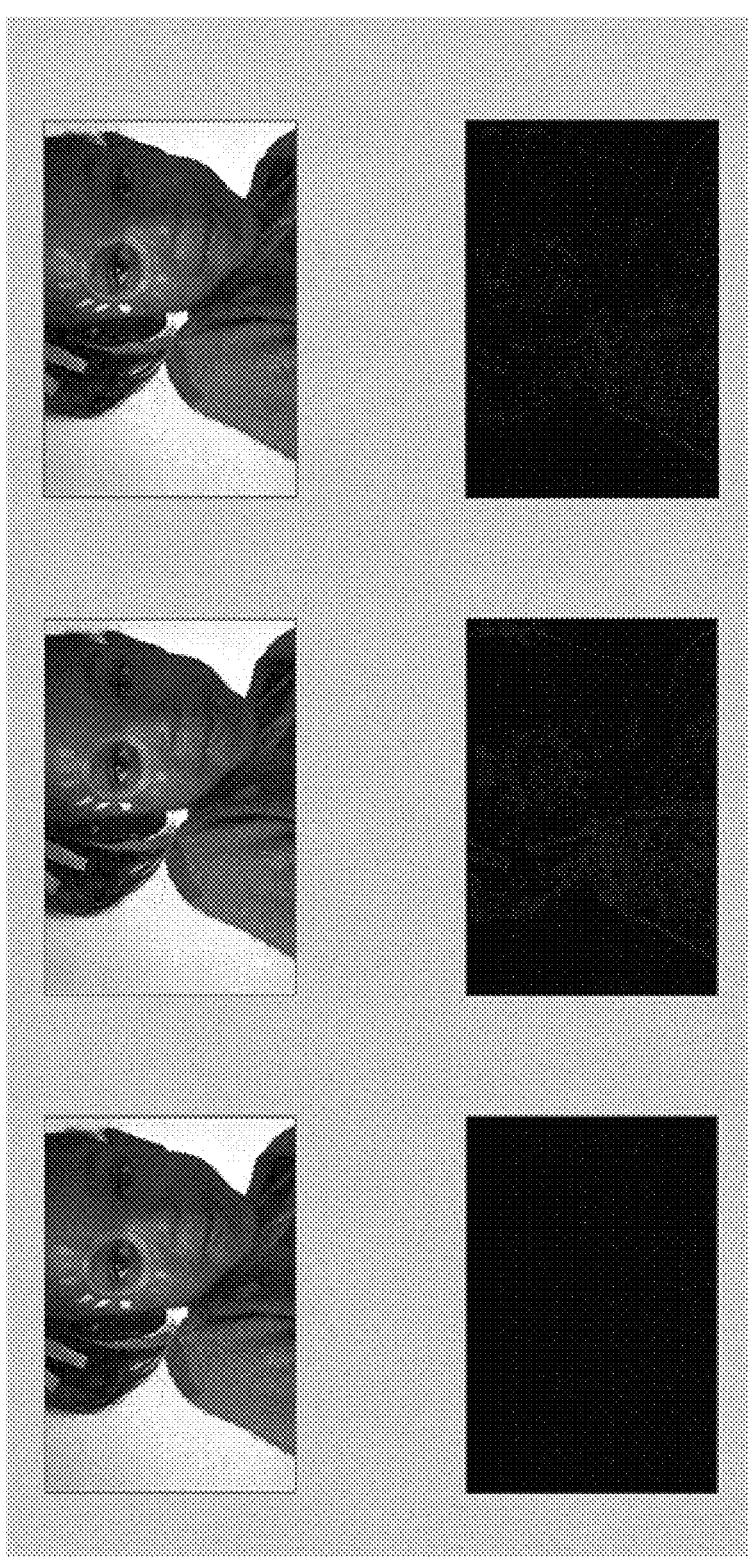
FIGS. 14-17 are original images, compressed images, and color differences, in accordance with some example embodiments.
Figure 15:
Figure 16:
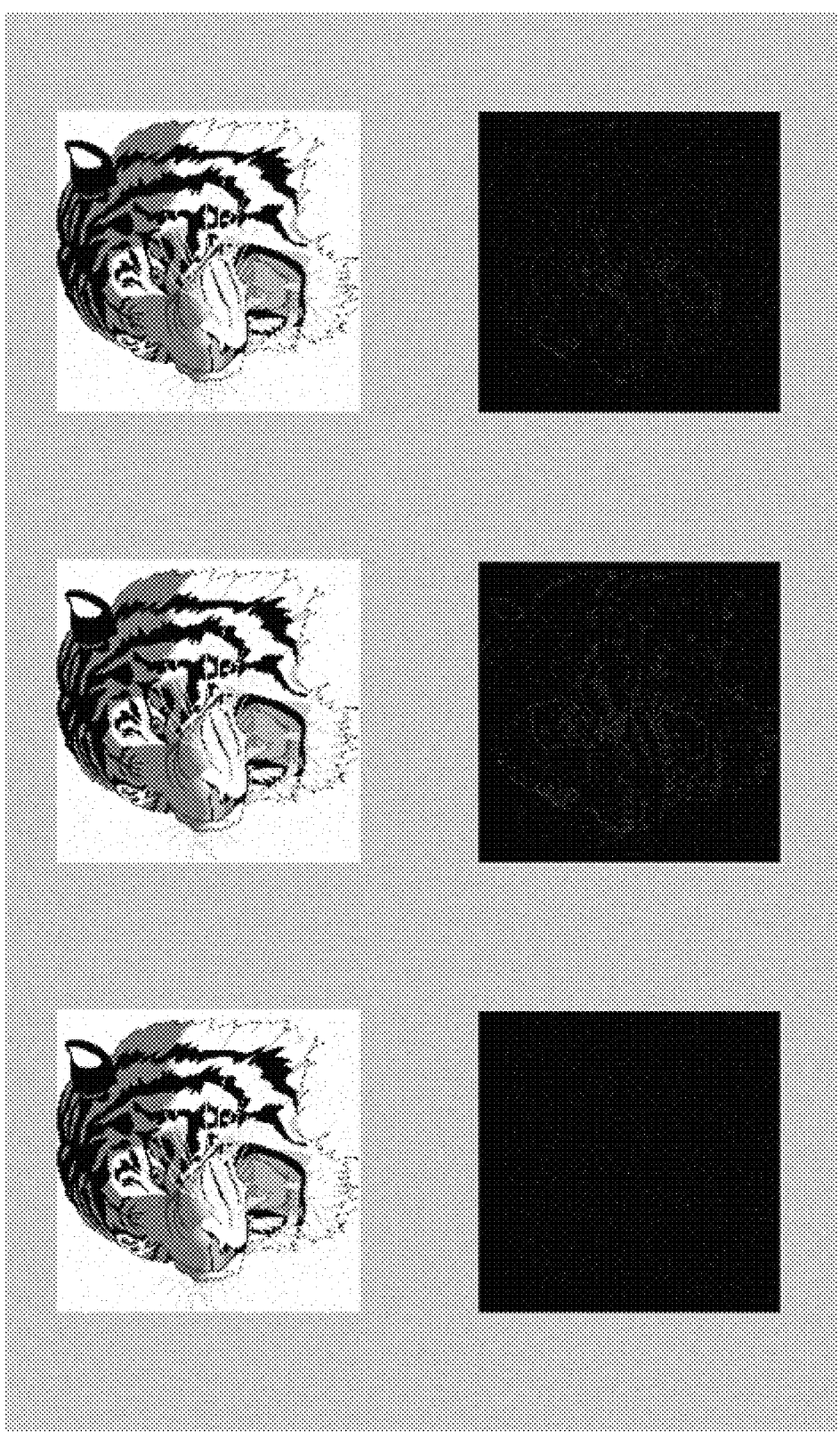
Figure 17:
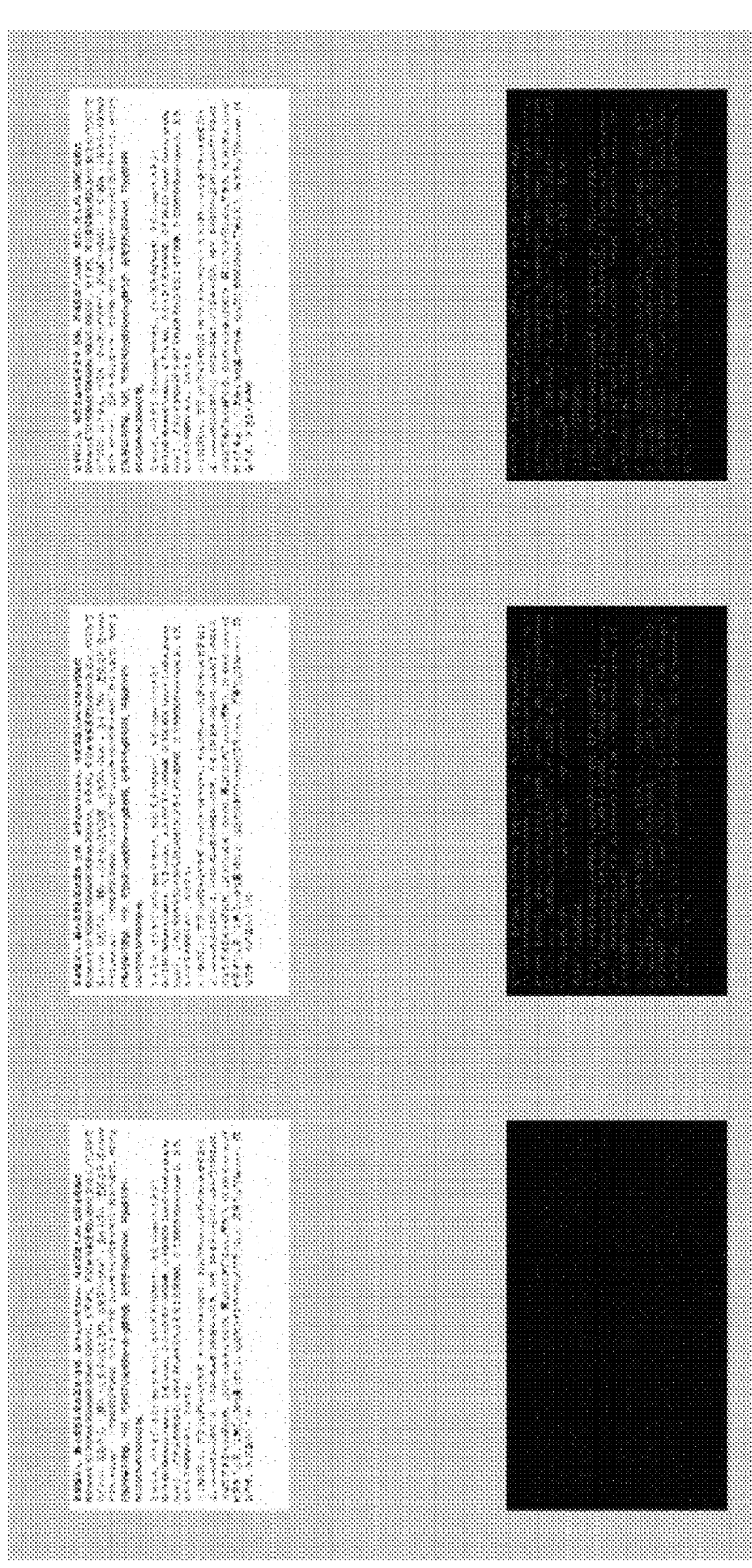

FIG. 13 illustrates an image compression result 1302, in accordance with some example embodiments. The image compression result 1302 is based on a test on multiple test sets, including Kodim 1-24 datasets, ASTC's LDR-RGB test sets, DXTC data sets, and other image sets including images with text, images with gradient colors, images with rainbow colors. Two compression methods are tested: 1. ASTC, each block includes 5*4 pixels, with 6.4 bpp. 2. Current method, each block includes 8*8 pixels, color map includes 8 colors, with 6 bpp.

As shown in FIG. 13, the image compression result 1302 includes a performance curve 1304 of current method and a performance curve 1306 of ASTC. To be clear, the lower the bpp is, the smaller memory and storage is used. The higher the PSNR is, the better the quality is. The average PSNR of the current method with 6 bpp (39.6) is only 3 dB lower than that of the ASTC with 6.4 bpp (42.7). Based on another test (not shown in FIG. 13), the average PSNR of the current method with 8 bpp is only 1 dB lower than that of the ASTC with 8 bpp.

Although the current method doesn't have significant better quality than ASTC, the current method has lower complexity (e.g., mostly comparisons and summations of values), higher flexibility (e.g., size of blocks can be freely changed), faster encoding/decoding speed (e.g., indexes and color map are easy to be stored and read), lower power consumption, lower development cost, lower manufacturing cost, and lower memory usage (e.g., higher compression rate). Such advantages make the current method drastically outshines ASTC, BC7, and other texture compression methods in embedded systems and highly competitive in other systems.

FIGS. 14-17 are example original images, compressed images, and color differences, in accordance with some example embodiments. The images in the first row of FIGS. 14-17 are original (uncompressed) images, compressed images using current method with 6 bpp, and compressed images using ASTC with 6.4 bpp, respectively. The images in the second row of FIGS. 14-17 are color differences from the original images, measured in RGB errors. Although the average PSNR of the current method with 6 bpp is 3 dB lower than that of the ASTC with 6.4 bpp as mentioned in FIG. 13, the qualities of compressed images using current method has no visible differences from that of compressed images using ASTC.

EXAMPLES

1. A method of texture compression, the method comprising:
  obtaining a block of an image, the block of the image including a plurality of pixels;
  obtaining a preliminary color map, the preliminary color map including a preliminary color;

iteratively updating the preliminary color map to generate an updated color map, the iterative updating of the preliminary color map including:
    in a first iteration, determining a first color for the updated color map based on the preliminary color and colors of the plurality of pixels; and
    in each of subsequent iterations, determining a remaining color for the updated color map based on determined colors in the updated color map in preceding iterations and the colors of the plurality of pixels;
  generating indexes for the plurality of pixels, wherein each of the plurality of pixels has an index pointing to either the first color or one of the remaining colors in the updated color map; and
  storing the updated color map and the indexes of the plurality of pixels as a representation of the block of the image.

2. The method of example 1, wherein the image is divided into a set of blocks and the method further comprises:
  storing a set of updated color maps and a set of indexes as a representation of the image.

3. The method of any of examples 1-2, further comprising:
  displaying the block of the image by picking up a color from the updated color map for each of the plurality of pixels based on the index corresponding to the each pixel.

4. The method of any of examples 1-3, wherein the determining of the first color for the updated color map in the first iteration comprises:
  determining, among the plurality of pixels, a target pixel that has a biggest color difference from the preliminary color; and
  designating a color of the target pixel as the first color of the updated color map.

5. The method of any of examples 1-4, wherein the determining of the remaining color for the updated color map in the each of the subsequent iterations comprises:
  determining, for each of the plurality of pixels, a minimum color difference between a color of the pixel and the colors in the updated color map determined in the preceding iterations;
  determining, among the plurality of pixels, a target pixel that has a biggest minimum color difference; and
  designating a color of the target pixel as the remaining color of the updated color map in the iteration.

6. The method of any of examples 1-5, wherein the generating of the indexes for the plurality of pixels comprises:
  for each of the plurality of pixels,
    obtaining a color difference threshold; and
    iteratively updating the color difference threshold and the index of the pixel, the iterative updating of the color difference threshold and the index of the pixel comprising:
      in each iteration,
        determining a color difference between a color of the pixel and a color in the updated color map;
        comparing the color difference between the color of the pixel and the color in the updated color map with the color difference threshold in a preceding iteration; and
        in response to a comparison result that the color difference between the color of the pixel and the color in the updated color map is less than the color difference threshold in the preceding iteration, updating the color difference threshold by the color difference between the color of pixel and the color in the updated color map; and updating the index of the pixel to point to the color in the updated color map.

7. The method of any of examples 1-6, further comprising:

for each of the first color and the remaining colors in the updated color map, determining a cluster of pixels from the plurality of pixels, the cluster of pixels having a same index pointing to the color in the updated color map;

determining an average color corresponding to colors of the cluster of pixels; and replacing the color in the updated color map by the average color to generate an averaged color map.

8. The method of example 7, further comprising:

updating the indexes of the plurality of pixels based on the averaged color map.

9. The method of any of examples 1-8, further comprising:

clustering the plurality of pixels into one or more clusters according to the indexes of the plurality of pixels;

determining, among the one or more clusters, a target cluster, wherein an average color difference among pixels in the target cluster is greater than a threshold; and replacing at least one color in the updated color map by at least one color of the pixels in the target cluster.

10. The method of any of examples 1-9, further comprising:

clustering the plurality of pixels into one or more clusters according to the indexes of the plurality of pixels;

determining, among the one or more clusters, a target cluster, wherein a count of pixels in the target cluster is greater than a threshold; and replacing at least one color in the updated color map by at least one color of the pixels in the target cluster.

11. A computing apparatus comprising:

a processor; and a memory storing instructions that, when executed by the processor, configure the computing apparatus to:

obtain a block of an image, the block of the image including a plurality of pixels;

obtain a preliminary color map, the preliminary color map including a preliminary color;

iteratively update the preliminary color map to generate an updated color map, wherein to iteratively update the preliminary color, the instructions configure the computing apparatus to:

in a first iteration, determine a first color for the updated color map based on the preliminary color and colors of the plurality of pixels; and in each of subsequent iterations, determine a remaining color for the updated color map based on determined colors in the updated color map in preceding iterations and the colors of the plurality of pixels;

generate indexes for the plurality of pixels, wherein each of the plurality of pixels has an index pointing to either the first color or one of the remaining colors in the updated color map; and store the updated color map and the indexes of the plurality of pixels as a representation of the block of the image.

12. The computing apparatus of example 11, wherein the instructions further configure the computing apparatus to:

display the block of the image by picking up a color from the updated color map for each of the plurality of pixels based on the index corresponding to the each pixel.

13. The computing apparatus of any of examples 11-12, wherein to determine the first color for the updated color map in the first iteration, the instructions configure the computing apparatus to:

determine, among the plurality of pixels, a target pixel that has a biggest color difference from the preliminary color; and designate a color of the target pixel as the first color of the updated color map.

14. The computing apparatus of any of examples 11-13, wherein to determine the remaining color for the updated color map in the each of the subsequent iterations, the instructions configure the computing apparatus to:

determine, for each of the plurality of pixels, a minimum color difference between a color of the pixel and the colors in the updated color map determined in the preceding iterations;

determine, among the plurality of pixels, a target pixel that has a biggest minimum color difference; and designate a color of the target pixel as the remaining color of the updated color map in the iteration.

15. The computing apparatus of any of examples 11-14, wherein to generate the indexes for the plurality of pixels, the instructions configure the computing apparatus to:

for each of the plurality of pixels, obtain a color difference threshold; and iteratively update the color difference threshold and the index of the pixel, wherein to iteratively update the color difference threshold and the index of the pixel, the instructions configure the computing apparatus to:

in each iteration, determine a color difference between a color of the pixel and a color in the updated color map;

compare the color difference between the color of the pixel and the color in the updated color map with the color difference threshold in a preceding iteration; and in response to a comparison result that the color difference between the color of the pixel and the color in the updated color map is less than the color difference threshold in the preceding iteration, update the color difference threshold by the color difference between the color of pixel and the color in the updated color map; and update the index of the pixel to point to the color in the updated color map.

16. The computing apparatus of any of examples 11-15, wherein the instructions further configure the computing apparatus to:

for each of the first color and the remaining colors in the updated color map, determine a cluster of pixels from the plurality of pixels, the cluster of pixels having a same index pointing to the color in the updated color map;

determine an average color corresponding to colors of the cluster of pixels; and replace the color in the updated color map by the average color to generate an averaged color map.

17. The computing apparatus of any of examples 16, wherein the instructions further configure the computing apparatus to:

update the indexes of the plurality of pixels based on the averaged color map.

18. The computing apparatus of any of examples 11-17, wherein the instructions further configure the computing apparatus to:

cluster the plurality of pixels into one or more clusters according to the indexes of the plurality of pixels;

determine, among the one or more clusters, a target cluster, wherein an average color difference among pixels in the target cluster is greater than a threshold; and replace at least one color in the updated color map by at least one color of the pixels in the target cluster.

19. The computing apparatus of any of examples 11-18, wherein the instructions further configure the computing apparatus to:

cluster the plurality of pixels into one or more clusters according to the indexes of the plurality of pixels;

determine, among the one or more clusters, a target cluster, wherein a count of pixels in the target cluster is greater than a threshold; and replace at least one color in the updated color map by at least one color of the pixels in the target cluster.

20. A non-transitory computer-readable storage medium, the computer-readable storage medium including instructions that when executed by a computer, cause the computer to:

obtain a block of an image, the block of the image including a plurality of pixels;

obtain a preliminary color map, the preliminary color map including a preliminary color;

iteratively update the preliminary color map to generate an updated color map, wherein to iteratively update the preliminary color map, the instructions cause the computer to:

in a first iteration, determine a first color for the updated color map based on the preliminary color and colors of the plurality of pixels; and in each of subsequent iterations, determine a remaining color for the updated color map based on determined colors in the updated color map in preceding iterations and the colors of the plurality of pixels;

generate indexes for the plurality of pixels, wherein each of the plurality of pixels has an index pointing to either the first color or one of the remaining colors in the updated color map; and store the updated color map and the indexes of the plurality of pixels as a representation of the block of the image.

CONCLUSION

The present disclosure provides system and methods for effectively compressing an image with low bandwidth and memory requirements while retaining a high quality. First, an original image is divided into multiple blocks. Each of the multiple blocks includes multiple pixels. Then a color map is iteratively updated based on a preliminary color in a preliminary color map, determined colors in preceding iterations in an updated color map, and colors of the multiple pixels in each block. An index is also determined for each pixel either during or after the iterations. The index of the pixel refers to a color in the updated color map that is most similar to the color of the pixel. Optionally, each of the colors in the updated color map can be further updated based on an average color of pixels that have the same index pointing to the color. The updated color map and indexes of the pixels are stored as a compressed and encoded form of the block.

The present disclosure potentially has at least the following advantages: 1. Lower complexity: the present disclosure can be employed by less complex hardware circuits, such as comparators and adders. 2. Higher flexibility: the division of blocks and the arrangement of pixels are flexible. Only the number of pixels in each block needs to be known. 3. Faster encoding/decoding speed: indexes and color map are easy to be stored and read, and consume less memory and storage. Based on the above advantages, the present disclosure, unlike other texture compression methods, is compatible with embedded systems which have limited processing power, memory, and storage. The present method can also be used in other systems, devices, and platforms, with a highly competitive performance.

What is claimed is:

1. A method of texture compression, the method comprising:

obtaining a block of an image, the block of the image including a plurality of pixels;

obtaining a preliminary color map, the preliminary color map including a preliminary color;

iteratively updating the preliminary color map to generate an updated color map, the iterative updating of the preliminary color map including:

in a first iteration, determining a first color for the updated color map based on the preliminary color and colors of the plurality of pixels; and in each of subsequent iterations, determining a remaining color for the updated color map based on determined colors in the updated color map in preceding iterations and the colors of the plurality of pixels;

generating indexes for the plurality of pixels, wherein each of the plurality of pixels has an index pointing to either the first color or one of the remaining colors in the updated color map; and storing the updated color map and the indexes of the plurality of pixels as a representation of the block of the image, wherein the generating of the indexes for the plurality of pixels comprises:

for each of the plurality of pixels, obtaining a color difference threshold; and iteratively updating the color difference threshold and the index of the pixel, the iterative updating of the color difference threshold and the index of the pixel comprising:

in each iteration, determining a color difference between a color of the pixel and a color in the updated color map;

comparing the color difference between the color of the pixel and the color in the updated color map with the color difference threshold in a preceding iteration; and in response to a comparison result that the color difference between the color of the pixel and the color in the updated color map is less than the color difference threshold in the preceding iteration, updating the color difference threshold by the color difference between the color of pixel and the color in the updated color map; and updating the index of the pixel to point to the color in the updated color map.

2. The method of claim 1, wherein the image is divided into a set of blocks and the method further comprises:

storing a set of updated color maps and a set of indexes as a representation of the image.

3. The method of claim 1, further comprising:

displaying the block of the image by picking up a color from the updated color map for each of the plurality of pixels based on the index corresponding to the each pixel.

4. The method of claim 1, wherein the determining of the first color for the updated color map in the first iteration comprises:

determining, among the plurality of pixels, a target pixel that has a biggest color difference from the preliminary color; and designating a color of the target pixel as the first color of the updated color map.

5. The method of claim 1, wherein the determining of the remaining color for the updated color map in the each of the subsequent iterations comprises:

determining, for each of the plurality of pixels, a minimum color difference between a color of the pixel and the colors in the updated color map determined in the preceding iterations;

determining, among the plurality of pixels, a target pixel that has a biggest minimum color difference; and designating a color of the target pixel as the remaining color of the updated color map in the iteration.

6. The method of claim 1, further comprising:

for each of the first color and the remaining colors in the updated color map, determining a cluster of pixels from the plurality of pixels, the cluster of pixels having a same index pointing to the color in the updated color map;

determining an average color corresponding to colors of the cluster of pixels; and replacing the color in the updated color map by the average color to generate an averaged color map.

7. The method of claim 6, further comprising:

updating the indexes of the plurality of pixels based on the averaged color map.

8. The method of claim 1, further comprising:

clustering the plurality of pixels into one or more clusters according to the indexes of the plurality of pixels;

determining, among the one or more clusters, a target cluster, wherein an average color difference among pixels in the target cluster is greater than a threshold; and replacing at least one color in the updated color map by at least one color of the pixels in the target cluster.

9. The method of claim 1, further comprising:

clustering the plurality of pixels into one or more clusters according to the indexes of the plurality of pixels;

determining, among the one or more clusters, a target cluster, wherein a count of pixels in the target cluster is greater than a threshold; and replacing at least one color in the updated color map by at least one color of the pixels in the target cluster.

10. A computing apparatus comprising:

a processor; and a memory storing instructions that, when executed by the processor, configure the computing apparatus to:

obtain a block of an image, the block of the image including a plurality of pixels;

obtain a preliminary color map, the preliminary color map including a preliminary color;

iteratively update the preliminary color map to generate an updated color map, wherein to iteratively update the preliminary color, the instructions configure the computing apparatus to:

in a first iteration, determine a first color for the updated color map based on the preliminary color and colors of the plurality of pixels; and in each of subsequent iterations, determine a remaining color for the updated color map based on determined colors in the updated color map in preceding iterations and the colors of the plurality of pixels;

generate indexes for the plurality of pixels, wherein each of the plurality of pixels has an index pointing to either the first color or one of the remaining colors in the updated color map; and store the updated color map and the indexes of the plurality of pixels as a representation of the block of the image, wherein to generate the indexes for the plurality of pixels, the instructions configure the computing apparatus to:

for each of the plurality of pixels, obtain a color difference threshold; and iteratively update the color difference threshold and the index of the pixel, the iterative updating of the color difference threshold and the index of the pixel comprising:

in each iteration, determine a color difference between a color of the pixel and a color in the updated color map;

compare the color difference between the color of the pixel and the color in the updated color map with the color difference threshold in a preceding iteration; and in response to a comparison result that the color difference between the color of the pixel and the color in the updated color map is less than the color difference threshold in the preceding iteration, update the color difference threshold by the color difference between the color of pixel and the color in the updated color map; and update the index of the pixel to point to the color in the updated color map.

11. The computing apparatus of claim 10, wherein the instructions further configure the computing apparatus to:

display the block of the image by picking up a color from the updated color map for each of the plurality of pixels based on the index corresponding to the each pixel.

12. The computing apparatus of claim 10, wherein to determine the first color for the updated color map in the first iteration, the instructions configure the computing apparatus to:

determine, among the plurality of pixels, a target pixel that has a biggest color difference from the preliminary color; and designate a color of the target pixel as the first color of the updated color map.

13. The computing apparatus of claim 10, wherein to determine the remaining color for the updated color map in the each of the subsequent iterations, the instructions configure the computing apparatus to:

determine, for each of the plurality of pixels, a minimum color difference between a color of the pixel and the colors in the updated color map determined in the preceding iterations;

determine, among the plurality of pixels, a target pixel that has a biggest minimum color difference; and designate a color of the target pixel as the remaining color of the updated color map in the iteration.

14. The computing apparatus of claim 10, wherein the instructions further configure the computing apparatus to:

for each of the first color and the remaining colors in the updated color map, determine a cluster of pixels from the plurality of pixels, the cluster of pixels having a same index pointing to the color in the updated color map;

determine an average color corresponding to colors of the cluster of pixels; and replace the color in the updated color map by the average color to generate an averaged color map.

15. The computing apparatus of claim 14, wherein the instructions further configure the computing apparatus to:

update the indexes of the plurality of pixels based on the averaged color map.

16. The computing apparatus of claim 10, wherein the instructions further configure the computing apparatus to:

cluster the plurality of pixels into one or more clusters according to the indexes of the plurality of pixels;

determine, among the one or more clusters, a target cluster, wherein an average color difference among pixels in the target cluster is greater than a threshold; and replace at least one color in the updated color map by at least one color of the pixels in the target cluster.

17. The computing apparatus of claim 10, wherein the instructions further configure the computing apparatus to:

cluster the plurality of pixels into one or more clusters according to the indexes of the plurality of pixels;

determine, among the one or more clusters, a target cluster, wherein a count of pixels in the target cluster is greater than a threshold; and replace at least one color in the updated color map by at least one color of the pixels in the target cluster.

18. A non-transitory computer-readable storage medium, the computer-readable storage medium including instructions that when executed by a computer, cause the computer to:

obtain a block of an image, the block of the image including a plurality of pixels, obtain a preliminary color map, the preliminary color map including a preliminary color;

iteratively update the preliminary color map to generate an updated color map, wherein to iteratively update the preliminary color map, the instructions cause the computer to:

in a first iteration, determine a first color for the updated color map based on the preliminary color and colors of the plurality of pixels, and in each of subsequent iterations, determine a remaining color for the updated color map based on determined colors in the updated color map in preceding iterations and the colors of the plurality of pixels;

generate indexes for the plurality of pixels, wherein each of the plurality of pixels has an index pointing to either the first color or one of the remaining colors in the updated color map; and store the updated color map and the indexes of the plurality of pixels as a representation of the block of the image, wherein to generate the indexes for the plurality of pixels, the instructions cause the computer to:

for each of the plurality of pixels, obtain a color difference threshold; and iteratively update the color difference threshold and the index of the pixel, the iterative updating of the color difference threshold and the index of the pixel comprising:

in each iteration, determine a color difference between a color of the pixel and a color in the updated color map;

compare the color difference between the color of the pixel and the color in the updated color map with the color difference threshold in a preceding iteration; and in response to a comparison result that the color difference between the color of the pixel and the color in the updated color map is less than the color difference threshold in the preceding iteration, update the color difference threshold by the color difference between the color of pixel and the color in the updated color map; and update the index of the pixel to point to the color in the updated color map.

* * * * *